(12) United States Patent
Waddington et al.

(10) Patent No.: US 11,231,264 B2
(45) Date of Patent: Jan. 25, 2022

(54) DOWNHOLE MEASUREMENTS

(71) Applicant: Read Cased Hole Limited, Aberdeen (GB)

(72) Inventors: Mark Waddington, Skelmersdale (GB); Maurillio Addario, Aberdeen (GB)

(73) Assignee: Read Cased Hole Limited, Aberdeen (GB)

( * ) Notice: Subject to any disclaimer, the term of this patent is extended or adjusted under 35 U.S.C. 154(b) by 364 days.

(21) Appl. No.: 16/483,719

(22) PCT Filed: Feb. 6, 2018

(86) PCT No.: PCT/GB2018/050331
§ 371 (c)(1),
(2) Date: Aug. 5, 2019

(87) PCT Pub. No.: WO2018/142165
PCT Pub. Date: Aug. 9, 2018

(65) Prior Publication Data
US 2020/0025548 A1    Jan. 23, 2020

(30) Foreign Application Priority Data

Feb. 6, 2017 (GB) ..................... 1701894

(51) Int. Cl.
*G01B 5/12* (2006.01)
*G01B 1/00* (2006.01)
*E21B 47/005* (2012.01)

(52) U.S. Cl.
CPC .............. *G01B 5/12* (2013.01); *E21B 47/005* (2020.05); *G01B 1/00* (2013.01)

(58) Field of Classification Search
CPC ........... G01B 5/12; G01B 1/00; E21B 47/005; E21B 47/08; F16L 2101/30
See application file for complete search history.

(56) References Cited

U.S. PATENT DOCUMENTS 5,548,900 A * 8/1996 Hunt-Grubbe ........... G01B 5/12
33/302
11,078,776 B2 * 8/2021 Wallace ................. E21B 47/01
(Continued)

FOREIGN PATENT DOCUMENTS

CN        201280930 Y     7/2009
EP        2474771 A2      7/2012
(Continued)

OTHER PUBLICATIONS

Search Report dated Feb. 20, 2017 in Patent Application No. GB1701894.6, filed Feb. 6, 2017.
(Continued)

*Primary Examiner* — Yaritza Guadalupe-McCall
(74) *Attorney, Agent, or Firm* — Foley & Lardner LLP

(57) ABSTRACT

A caliper finger for use as part of a multi-finger caliper logging tool has a body formed substantially of a first material and a finger tip formed substantially of a second material which has greater mechanical durability than the first material. The first material and second material are fused directly together at a joint between the first material and the second material. The finger tip may comprise a plurality of successively-fused layers of the second material, which can then be machined at its outer surface after fusion of the plurality of layers. The second material may be a composite material of tungsten carbide combined with a base material in which the tungsten carbide is embedded and securely bonded to the finger.

22 Claims, 2 Drawing Sheets

(56) References Cited

U.S. PATENT DOCUMENTS

| | | | | |
|---|---|---|---|---|
| 2015/0143709 A1* | 5/2015 | Sallwasser | .............. | E21B 47/08 |
| | | | | 33/544.3 |
| 2016/0018548 A1 | 1/2016 | McCafferty | | |
| 2020/0025548 A1* | 1/2020 | Waddington | .......... | E21B 47/005 |
| 2020/0263532 A1* | 8/2020 | Wallace | .................. | E21B 47/01 |

FOREIGN PATENT DOCUMENTS

| | | | | | |
|---|---|---|---|---|---|
| GB | 2281968 A | * | 3/1995 | .............. | G01B 5/12 |
| GB | 2281968 A | | 3/1995 | | |

OTHER PUBLICATIONS

International Search Report and Written Opinion dated Apr. 20, 2018 in International Patent Application No. PCT/GB2018/050331, filed Feb. 6, 2018.

\* cited by examiner

DOWNHOLE MEASUREMENTS

The present invention relates to apparatus for making measurements downhole, and more particularly to a caliper finger as used in a multi-finger caliper logging tool and, in particular, to a caliper finger having a durable tip.

CN201280930, GB2281968, EP2474771 and US2016/018548 are earlier disclosures of inspection tools which are useful for understanding the present invention.

BACKGROUND

In drilling oil and gas wells, casing is used to support the well bore and act as a barrier between the well bore and the formation. Well casing and other tubulars, such as liners and production tubing used in a well bore, are subject to extreme conditions of temperature, pressure and chemical exposure. As a result, the casing can be liable to buckle, changing its cross-sectional area from the ideal circular to elliptical or other eccentricities with corresponding changes over its length. Additionally, the inner surface of the casing may be subject to corrosion and chemical abrasion, creating roughening, pitting and loss of material. This deterioration of the casing can have devastating effects on the well if the casing were to thin to the point that it could no longer act as a barrier to pressure and split, develop a leak and allow the flow of fluids between the wellbore and the formation, or bulge and create an obstruction to other tubulars being run into the well bore.

Casings are therefore periodically inspected. This is achieved by running a logging tool into the well bore. These tools are run on wireline or slickline. The tool contains various instruments designed to measure dimensions of the casing such as the inner diameter ('caliper') and wall thickness along the length of the casing. A typical prior art caliper tool is shown in FIG. 1. Caliper tool A includes feeler fingers B which are biased in an open position to contact the inner surface C of the casing D. The tool A is provided with a caliper mechanism E having a number of fingers B, and typically between 24 to 56 are provided on a single tool. Each finger B is fixed at a first end to the elongate shaft F of the tool A and the fingers B are arranged circumferentially around the tool A with the distal end of each finger B able to be biased outwards. The tool A is inserted downhole in a closed position (not shown) before the fingers B are then biased outwards. Centralising rollers G provided on the shaft F centralise the tool A within the casing D and tool A is then slowly retracted from the well. As the caliper E moves over the casing D, the fingers B, or feeler arms, follow the contour of the casing's inside wall C. The mechanical actuation of each finger B is, within the tool A, sensed and converted into data which can be used to provide a high resolution radial and vertical representation of the interior of the casing. From the representation, casing corrosion ranging from small pits and the development of scale, to axial splits in the casing, can be identified.

To respond to small deviations on the casing wall, the fingers are cast in thin metal with a rounded top tip which contacts the inner surface of the casing. Each finger is typically formed of beryllium copper, an alloy which is prized for being easily machined while having high tensile strength. It also has "non-sparking" properties, thus emitting no sparks or "cold sparks" when struck against other metals. This is a requirement of materials used in oil and gas well bores.

While beryllium copper has many advantages it also has a major disadvantage. It is a relatively soft metal and therefore the tips of the feeler fingers typically wear quickly. This necessitates regular inspection and replacement of fingers to ensure correct measurements are made, adding to the time and costs in using the tool.

It is recognised by those skilled in the art that tungsten carbide is a material which resists the harshest environments of corrosion, high temperature, impact, high compressive loads, deformation and severe abrasion. It is, however, heavier than beryllium copper and difficult to machine. Consequently, it is not possible to make the fingers from tungsten carbide or cemented carbide alone.

In an effort to increase the durability and wear of the fingers, tungsten carbide has been applied as a coating to the tips. This gives a limited increase in operational use as the tungsten also wears relatively quickly due to the quantity applied. It has also been found to detach when the fingers are used in highly corrosive environments, such as in 'sour' wells. Sour wells contain hydrogen sulphide and at the coating edges or at points of defect, such as cracking or wear of the coating, the hydrogen sulphide causes delamination to occur. As a result, these fingers require constant inspection and it can be difficult to determine the degree of wear.

A bead of tungsten carbide has also been attached to the tip. This advantageously gives a tungsten carbide surface for contact with the casing wall and an easily determinable wear indication as the ball changes shape as it is abraded. However, the contact point provides a point of weakness and the bead can become easily detached.

A piece of the tip has also been removed and an insert of tungsten carbide attached to provide a hard wearing area of contact. The insert is attached by soldering or brazing.

Both the processes of brazing and soldering bring together two separate metals with a metallic filler, which is referred to as the braze or solder, which flows over the joint and creates a bond that can be relied upon. Whilst this connection method creates a bond that can be very difficult to see, which can operate at great range of heats and temperatures and is mechanically resilient, it does have a major disadvantage. When the bead or insert is used in corrosive downhole environments, the presence of hydrogen sulphide causes the brazed joint to corrode and for the connection to fail resulting in the loss of the insert.

It is therefore an object of the present invention to provide a caliper finger having a durable caliper finger tip.

SUMMARY

According to a first aspect of the invention there is provided a caliper finger for use as part of a multi-finger caliper logging tool, the caliper finger having a body formed substantially of a first material and a finger tip formed substantially of a second material, the caliper finger having a joint between the first material and the second material, wherein the second material has greater mechanical durability than the first material; wherein at the joint the first material and second material are fused directly together.

In certain examples the finger tip comprises a plurality of successively-fused layers of the second material. In certain examples, the finger tip comprises a machined outer surface. Optionally the plurality of fused layers of second material are machined after fusion of the plurality of layers of second material with the finger.

By fusing the first material and second material together, a strong, metallurgical bond is formed whereby no other material is introduced into the caliper finger body and tip joint which could present a weakness in the caliper finger.

Optionally the first material comprises a metal alloy. Use of a suitable metal alloy for the caliper finger body aids in the ease of manufacture of the body whilst providing the body with resilient tensile strength.

Optionally the first material is or comprises beryllium copper. Use of beryllium copper enables the caliper finger body to be easily machined and provides a caliper finger body which has high tensile strength while being "non-sparking". Additionally it offers the opportunity for the present invention to be retrofitted to existing and worn caliper fingers.

Optionally the second material is or comprises a composite material. Use of a suitable composite material for the finger tip allows the use of durable materials for the surface of the caliper that is in contact with the casing surface, thereby allowing the contact surface of the caliper to be more hard wearing and durable, but at the same time forms a strong joint with the finger.

Optionally the second material comprises tungsten carbide. Optionally the composite material of the second material comprises tungsten carbide combined with a base material in which the tungsten carbide is embedded and more securely bonded to the finger. In certain examples the base material in the composite can be a metal e.g. at least one of (or both of) nickel and chromium. Use of a tungsten carbide composite material for the second material allows for bonding of durable material to the finger body in a reliable and economical manner to create a true metallurgical bond with very high inter-particle strength. The second material is mechanically durable due to the exposure of tungsten carbide particles through the upper surface of the composite which provides a very hard wearing and durable surface for the finger tip while at the same time facilitating reliable bonding of the second material to the finger.

Optionally the joint between the first material and second material is formed by welding, optionally without any inclusion of a further material in the joint. Optionally the first material and second material each melt along the joint such that they fuse together when they cool resulting in a strong, clean metallurgically bonded joint. Optionally the base material in the composite second material is melted and fused to the first material in the joint, optionally without changing the phase of other components of the composite second material.

Optionally the tip is shaped to match existing caliper finger tips. In this way, the tungsten carbide can be ground to provide a standard shape of tip. The tip will be of a different colour and thus wear of the tip can be easily identified.

Optionally the caliper finger tip comprises a plurality of layers of the second material. In this way, the tungsten carbide material on the tip is more easily built up through fusion of subsequent layers.

According to a second aspect of the present invention there is provided a method of manufacturing a caliper finger for use as part of a multi-finger caliper logging tool, the method comprising the steps:

a) providing a caliper finger in a first material;
b) fusing a second material to an end of the caliper finger; and
c) machining at least the second material to create a tip of the caliper finger from substantially the second material.

In this way, a tip is formed on the caliper finger made of the second material which can be harder wearing and more durable than the first material.

Optionally step (b) is carried out by welding. Use of welding causes the first material and second material to heat to a sufficient temperature so that each of the first material and second material melt along the joint and fuse together as they cool.

Optionally step (b) is carried out by laser welding. This process provides controlled heating in the small dimensions of the finger tip i.e. across a weld length of less than 1 cm. Other welding techniques such as e-beam may be used.

Optionally step (b) comprises first welding a layer of the second material on the first material at the joint location and then welding one or more further layers of the second material upon a previous layer of the second material. The building of successive layers of the second material from the joint between the first and second materials enables a sufficient quantity of the second material to be formed at the joint for the finger tip to be machined into shape.

Optionally step (c) is carried out by grinding the second material at the joint. Grinding may be done by diamond grinding. In this way, only a small piece of the material requires to be machined to achieve a tip.

Optionally the first material is or comprises beryllium copper. Optionally the second material is or comprises a tungsten carbide composite material. In this way, the body of the finger is formed of a lightweight easily machinable material and a more durable and harder wearing material forms the tip.

BRIEF DESCRIPTION OF THE DRAWINGS

An embodiment of the present invention will now be described with reference to the following figures, by way of example only, in which.

DETAILED DESCRIPTION

Figure 2:
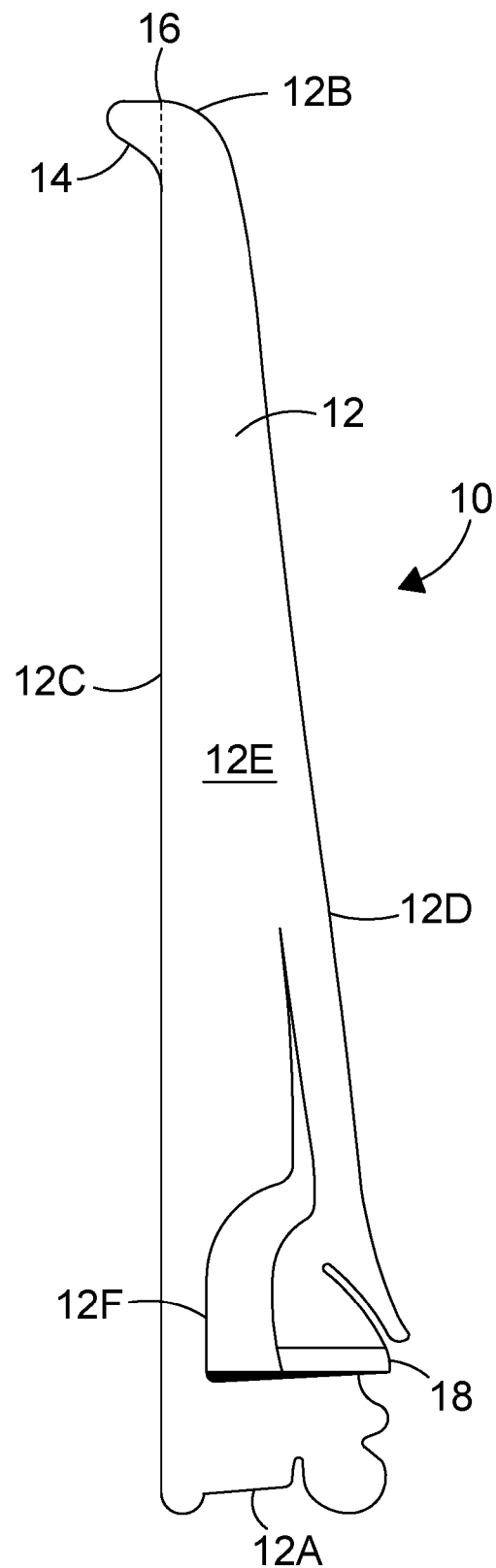
FIG. 2 shows a caliper finger in accordance with an embodiment of the present invention.

With reference to FIG. 2, there is shown a caliper finger 10 formed of an elongate body 12 having a first end 12A and a distal end 12B, a front side 12C and a rear side 12D. These enclose a front face 12E and a back face (not shown). Between the faces the finger 10 has a thickness of 0.5-2 mm. The drawing is approximately to scale for an embodiment of one type of finger 10 used. It will be appreciated that other finger shapes or thicknesses may be used.

At distal end 12B of body 12 there is provided a caliper finger tip 14 which projects from the front face 12C. The caliper finger tip 14 is connected to the caliper finger body 12 at joint 16. The caliper finger 10 is secured to a caliper mechanism (ref. no. E, FIG. 1) at first end 12A. The finger is sprung by virtue of a sliding section 18 at the rear face 12D at the first end 12A which can move towards an inner face 12F to provide increased resolution when a measurement is made.

Figure 1:
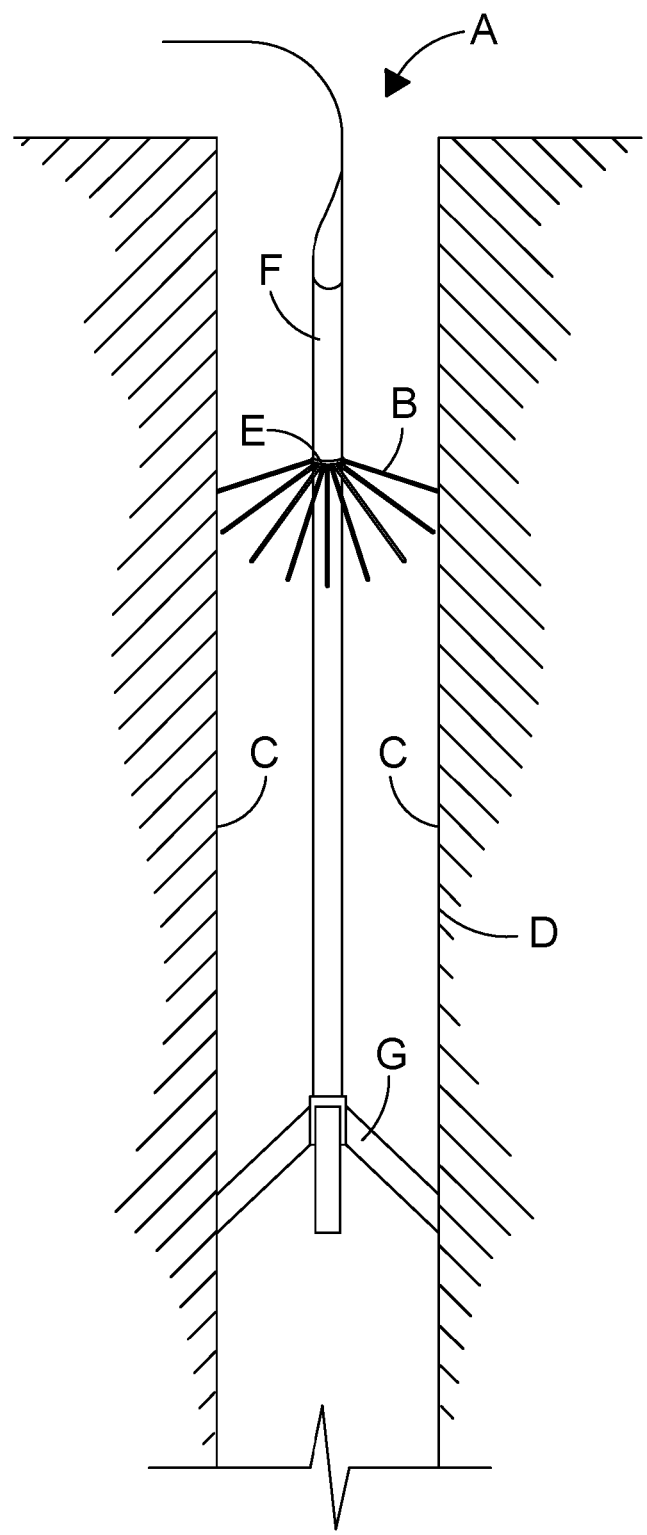
FIG. 1 shows a known multi-finger caliper logging tool arrangement.

In use, the finger 10 is connected via the first end 12A to a caliper mechanism E which biases the caliper finger 10 in the direction of the front face 12C such that the finger tip 14 is brought into contact with an inner wall C of a casing D (see FIG. 1).

The caliper finger body 12 is formed of a first material which optionally is a metal alloy and, in this case, comprises beryllium copper. Caliper finger tip 14 is formed of a second material, which is of greater mechanical durability than the first material and which, in this case, is a composite material comprising tungsten carbide, in this example, provided in a composite with a base material which in this case comprises either nickel or chromium. The joint 16 between the finger tip 14 and finger body 12 is a welded joint with the tungsten carbide fused directly to the beryllium copper. The tungsten carbide material in the tip 14 provides a hard, wear resistant finger tip which ensures longevity of the tool 10 as it is able to tolerate repeated use with little damage to the tip 14 from resulting from wear against the internal surface of the casing.

The joint 16 is parallel to and a continuation of the face 12C so that during use forces acting upon the tip 14 are transferred perpendicularly through the joint 16. Had the joint been formed perpendicular to the face 12C, then forces applied to the tip 14 during use would act along the joint and may cause the joint to weaken, crack or split at the joint line. Additionally, a greater quantity of the second material would be required to form the tip 14.

The welding of the joint 16 can be achieved by laser welding which causes the first material and second material to heat to a sufficient temperature that each of the first material and second material melt along the joint and fuse together as they cool. In this example, the base material (e.g. the nickel or chromium) of the second material melts to fuse with the first material along the joint. Melting and fusion of only one component of the composite second material (i.e. the base material) is typically sufficient to form the joint without requiring melting of all components of the composite second material. Laser welding advantageously directs the heat over a smaller area than traditional welding, e.g. Tungsten Inert Gas (TIG), and reduces the amount of heating through the materials away from the joint 16. A strong, metallurgical bond is thus formed whereby no other material is introduced into the caliper finger body and tip joint 16; such a metallurgical bond reduces the risk of weakness in the caliper finger 10 at the joint 16. It will be appreciated by those skilled in the art that other techniques which cause the materials to fuse without the presence of a third material can be used.

In one embodiment, the caliper finger tip is formed of a first layer of tungsten carbide material being fused to the beryllium copper body 12 by laser welding along the joint 16. Another layer of tungsten carbide material is then welded to the first layer of tungsten carbide material which is joined to the finger body 12. Subsequent successive layers of the tungsten carbide material are then, in turn, fused to the existing layers, again typically melting and fusing only the base material in the composite second material without requiring melting and fusion of all components of the second material. The building of successive layers of the tungsten carbide material enables a sufficient quantity of the tungsten carbide material to be formed at the joint 16. Once the multiple layers have been built up to a height required of the tip 14, the finger tip 14 is machined into the desired shape and thickness of the tip. This is optionally the shape found on typical caliper fingers presently available and as shown in FIG. 2.

Shaping of the tip 14 in this example is done by diamond grinding or other known techniques for use on tungsten carbide. As only the tip 14 needs to be ground, the process is efficient and provides a hard wearing and durable caliper finger 10.

Additionally, as the tungsten carbide material has a different colour to the beryllium copper it is easy to determine when the tungsten carbide material has worn away and by what amount. This provides a simpler and quicker method for determining wear on the caliper finger 10.

The principle advantage of the present invention is that it provides the caliper finger with a finger tip which is connected securely to the finger body thus providing a robust, long lasting caliper finger.

A further advantage of the present invention is that it provides a caliper finger with a durable tip which is less prone to damage by the corrosive effects of chemicals such as those found in "sour" wells.

It will be appreciated by those skilled in the art that various modifications may be made to the invention herein described without departing from the scope thereof. For example, although the caliper is formed of a plurality of fingers biased outwards, the caliper may instead comprise a plurality of leg type resiliently biased members which are secured to the tool shaft at each opposing end and having a knee type knuckle joint which is biased outwards to be in contact with the casing wall. Such knee type leg arrangements could be provided with a welded tungsten carbide material "cap" at the tip of the knee joint which is in contact with the internal casing wall. In addition, other caliper type arrangements may be used which have the point of contact with the casing wall formed as a tip of welded tungsten carbide material.

The invention claimed is:

1. A caliper finger for a multi-finger caliper logging tool, the caliper finger having a body comprising a first material and a finger tip comprising a second material, the caliper finger having a joint between the first material and the second material, wherein the second material has greater mechanical durability than the first material; wherein at the joint the first material and second material are fused directly together; wherein the finger tip comprises a plurality of successively fused layers of the second material; and wherein the finger tip comprises a machined outer surface.

2. A caliper finger according to claim 1 wherein the first material comprises a metal alloy.

3. A caliper finger according to claim 2 wherein the first material comprises beryllium copper.

4. A caliper finger according to claim 1, wherein the second material is a composite material.

5. A caliper finger according to claim 4, wherein the second material comprises tungsten carbide.

6. A caliper finger according to claim 1, wherein the second material is a composite material of tungsten carbide and a base material comprising at least one of nickel and chromium.

7. A caliper finger according to claim 1 wherein the joint between the first material and second material is a weld.

8. A caliper finger according to claim 1, wherein the second material is a composite of tungsten carbide and a base material and wherein the base material of the second material is fused directly with the first material.

9. A caliper finger according to claim 8, wherein the base material in the composite second material is fused with the first material at the joint, and wherein the tungsten carbide is not fused with the first material at the joint.

10. A method of manufacturing a caliper finger for a multi-finger caliper logging tool, the method comprising the steps:
providing a caliper finger formed of a first material;
successively fusing a plurality of layers of a second material to an end of the caliper finger; and
machining at least the second material to create a tip of the caliper finger from the second material.

11. A method of manufacturing a caliper finger according to claim 10, wherein the step of successively fusing a plurality of layers of second material to the end of the caliper finger is carried out by welding.

12. A method of manufacturing a caliper finger according to claim 10, wherein the step of successively fusing a plurality of layers of second material to the end of the caliper finger is carried out by laser welding.

13. A method of manufacturing a caliper finger according to claim 10, wherein the step of successively fusing a plurality of layers of second material to the end of the caliper finger comprises welding a first layer of the second material on the first material at the joint location and then welding at least one further layer of the second material on the first layer of the second material.

14. A method of manufacturing a caliper finger according to claim 10 wherein the step of machining at least the second material to create a tip of the caliper finger from the second material is carried out by grinding the second material.

15. A method of manufacturing a caliper finger according to claim 10 wherein the first material comprises beryllium copper.

16. A method of manufacturing a caliper finger according to claim 10 wherein the second material is a composite material.

17. A method of manufacturing a caliper finger according to claim 16, wherein the second material comprises tungsten carbide.

18. A method as claimed in claim 10, wherein the second material is a composite material of tungsten carbide and a base material and wherein the weld is formed by fusing the base material of the second material directly with the first material.

19. A method as claimed in claim 18, wherein the base material comprises at least one of nickel and chromium.

20. A method as claimed in claim 18, wherein the base material in the composite second material is fused with the first material at the joint, and wherein the tungsten carbide is not fused with the first material at the joint.

21. A method as claimed in claim 10, wherein the plurality of fused layers of second material are machined after fusion of the plurality of layers of second material with the finger.

22. A caliper finger for a multi-finger caliper logging tool, the caliper finger having a body formed of a first material and a finger tip formed of a second material, the caliper finger having a joint between the first material and the second material, wherein the second material has greater mechanical durability than the first material; wherein at the joint the first material and second material are fused directly together; wherein the finger tip comprises a plurality of fused layers of the second material; wherein the finger tip comprises a machined outer surface; wherein the second material comprises a composite material of tungsten carbide and a base material wherein the base material of the second material is fused directly with the first material in the joint and wherein the tungsten carbide is not fused with the first material at the joint.

* * * * *